United States Patent
Augsburger et al.

(10) Patent No.: US 11,101,755 B2
(45) Date of Patent: Aug. 24, 2021

(54) ARRANGEMENT FOR INJECTING ELECTRIC POWER INTO AN AC NETWORK BY MEANS OF AN ASYNCHRONOUS MACHINE, AND METHOD FOR OPERATING THE ASYNCHRONOUS MACHINE

(71) Applicant: SIEMENS AKTIENGESELLSCHAFT, Munich (DE)

(72) Inventors: Friedemann Augsburger, Altdorf (DE); Rainer Gruber, Heilsbronn (DE); German Kuhn, Erlangen (DE); Alexander Rentschler, Bensheim (DE); Kunal Sharma, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/632,594

(22) PCT Filed: Jul. 21, 2017

(86) PCT No.: PCT/EP2017/068460
§ 371 (c)(1),
(2) Date: Jan. 21, 2020

(87) PCT Pub. No.: WO2019/015777
PCT Pub. Date: Jan. 24, 2019

(65) Prior Publication Data
US 2020/0204097 A1   Jun. 25, 2020

(51) Int. Cl.
*H02P 9/30*   (2006.01)
*H02P 9/00*   (2006.01)
(Continued)

(52) U.S. Cl.
CPC .............. *H02P 9/305* (2013.01); *H02P 9/007* (2013.01); *H02P 9/105* (2013.01); *H02P 2103/10* (2015.01)

(58) Field of Classification Search
CPC .......... H02P 9/305; H02P 9/007; H02P 9/105; H02P 2103/10
See application file for complete search history.

(56) References Cited

U.S. PATENT DOCUMENTS

| 7,868,594 B2 | 1/2011 | Lehmann et al. | |
| 2001/0026427 A1* | 10/2001 | Mahlein | H02M 5/271 |
| | | | 361/91.1 |

FOREIGN PATENT DOCUMENTS

| CN | 102983735 B | 5/2015 |
| WO | WO2006072498 A1 | 7/2006 |

OTHER PUBLICATIONS

Kammerer Felix et al: "Benefits of Operating Doubly Fed Induction Generators by Modular Multilevel Matrix Converters", PCIM Europe 2013—International Exhibition and Conference for Power Electronics, Intelligent Motion, Renewable Energy and Energy Management Nuremberg, May 14-16, 2013—Proceedings., XP055458527, ISBN: 978-3-8007-3505-1, pp. 1-8, Figures 1-3; das ganze Dokument; 2013.

* cited by examiner

*Primary Examiner* — Viet P Nguyen
(74) *Attorney, Agent, or Firm* — Laurence Greenberg; Werner Stemer; Ralph Locher

(57) ABSTRACT

An arrangement contains an asynchronous machine, which, in generator operation, is configured to feed electric power into an AC network. Accordingly, the asynchronous machine can be dual-fed by a modular multi-stage converter in a matrix configuration. The asynchronous machine has a rotor
(Continued)

and the modular multi-stage converter is connected to the rotor of the asynchronous machine.

9 Claims, 2 Drawing Sheets

(51) Int. Cl.
    *H02P 9/10*           (2006.01)
    *H02P 103/10*      (2016.01)

ARRANGEMENT FOR INJECTING ELECTRIC POWER INTO AN AC NETWORK BY MEANS OF AN ASYNCHRONOUS MACHINE, AND METHOD FOR OPERATING THE ASYNCHRONOUS MACHINE

BACKGROUND OF THE INVENTION

Field of the Invention

The invention relates to an arrangement comprising an asynchronous machine which, in generator operation, is configured to inject electrical energy into an AC network.

Known electricity generating installations, which are customarily driven by means of turbines, of high nominal power rating are almost exclusively coupled to the AC network via synchronous generators. The AC network is generally an electricity supply or distribution network. For the employment of the synchronous machine, a mechanical turbine frequency is established on the basis of the electrical network frequency, or a whole-number divisor thereof. The fixed mechanical turbine frequency significantly restricts the optimization of the drive system with respect to efficiency, costs and output. In the case of synchronous machines, full-power converters are customarily employed which, however, are relatively cost-intensive, as the entire capacity is transmitted via the full-power converter, which must therefore be rated accordingly.

From WO 2006/072498 A1, the use of a double-feed asynchronous machine which is driven by a drive system of a generator, in combination with a four-quadrant converter, is known for the delivery of a three-phase alternating electric current of variable frequency. However, four-quadrant converters of this type are complex to produce.

SUMMARY OF THE INVENTION

The object of the invention is the proposal of a generic arrangement, which is as cost-effective and flexible as possible in use.

This object is fulfilled by an arrangement comprising an asynchronous machine which, in generator operation, is configured to inject electric power into an AC network, wherein the asynchronous machine can be operated in a double-feed arrangement by a modular multi-stage converter in a matrix configuration.

Accordingly, the asynchronous machine in the arrangement according to the invention is a double-feed asynchronous machine (double-feed induction generator, or DFIG). The asynchronous machine is connected to the AC network, in a matrix configuration, via the modular multi-stage converter. The modular multi-stage converter is characterized by a modular design. To this end, the modular multi-stage converter comprises two-pole switching modules which are mutually connectable in series, wherein each switching module comprises a power semiconductor circuit and a dedicated energy store. Each of the switching modules can be individually actuated by means of an actuating device. A voltage across, or a voltage present on a series-connected arrangement of switching modules is equal to the sum of the voltages across, or the voltages present on the associated switching modules. By means of the modular multi-stage converter, a particularly advantageous stepped AC voltage can be generated. In the present context, a matrix configuration is a configuration of the multi-stage converter, wherein a multi-phase output-side AC voltage on the generator is directly converted into a likewise multi-phase network side AC voltage, i.e. specifically with no intermediate DC voltage circuit.

The use of a modular multi-stage converter in a matrix configuration for the connection of a DFIG to the AC network provides the advantage of scalability. As a result of its scalability, the modular multi-stage converter, by the use of equivalent components, can be adapted to the respective application and the respective asynchronous machine or DFIG. This reduces the costs of the arrangement. A further advantage is provided, in that it is necessary for the modular multi-stage converter of the arrangement according to the invention to be designed with a lower nominal power rating than the full-power converter from the known arrangement, which also delivers a cost benefit. Moreover, the above-mentioned advantageous sinusoidal characteristic of the voltage or current which can be generated by means of the modular multi-stage converter permits the reduction of thermal stress in the asynchronous machine.

Appropriately, the modular multi-stage converter is connected to a rotor of the asynchronous machine. At the same time, a stator of the asynchronous machine, via a dedicated connection, is connected to the AC network. In a sub-synchronous generator operation of the asynchronous machine, the rotor draws electrical compensating energy from the AC network via the multi-stage converter. The total energy delivered by the asynchronous machine is injected into the AC network via the stator. The total energy, or the corresponding total power, is greater than the compensating energy or compensating power. For this reason, the modular multi-stage converter can be designed with a relatively low nominal power rating. According to one form of embodiment of the invention, the modular multi-stage converter is designed with a nominal power rating which corresponds to between 20% and 50% of the nominal input power rating of the asynchronous machine. The nominal input power rating corresponds, for example, to the nominal mechanical power rating which is delivered by a turbine which is connected to a shaft of the asynchronous machine.

The multi-stage converter preferably comprises a plurality of converter arms, wherein each converter arm incorporates a series-connected arrangement of two-pole switching modules, wherein each of the switching modules comprises interruptible power semiconductors and an energy store. Each converter arm appropriately extends between one phase of a first multi-phase AC voltage terminal of the multi-stage converter and one phase of a second multi-phase AC voltage terminal of the multi-stage converter. The power semiconductors can be, for example, IGBTs, IGCTs or similar.

The multi-stage converter preferably comprises an n-phase first AC voltage terminal, which is connected to the asynchronous machine, and an m-phase second AC voltage terminal, which is connected to the AC network, wherein each of the n phases of the AC voltage terminal is connected to each of the m phases of the second AC voltage terminal by means of exactly one of the converter arms. The connection with the AC voltage network can also be executed, for example, via a transformer.

According to one form of embodiment of the invention, the power semiconductors and the energy store of the switching modules are respectively mutually connected in a full-bridge circuit. A full-bridge circuit is characterized in that two series-connected arrangements of two semiconductor switches are connected in parallel, wherein the energy store, generally in the form of a capacitor, is arranged in parallel with the series-connected arrangements of the semiconductor switches. The full-bridge module circuit comprises two connection terminals or poles, of which one is arranged, with one potential point, between the semiconductor switches of one series-connected arrangement, and the other is arranged, with one potential point, between the semiconductor switches of the other series-connected arrangement. On the connection terminals of the semiconductor switching module, a voltage across the energy store or the energy store voltage present, a zero voltage or the inverse energy store voltage can be generated.

Preferably at least one charging resistor is provided, which is arranged in one of the converter arms, and can be bridged by means of a bridging switch. The function of the charging resistor is the pre-charging of the energy stores of the switching modules. Each of the converter arms can be equipped with a charging resistor of this type.

The multi-stage converter is preferably connected to the AC network via a transformer. The arrangement can additionally comprise further components such as, for example, a grounding device and/or a neutral grounding transformer for symmetrizing asymmetric faults, which are arranged between the multi-stage converter and the transformer.

According to one form of embodiment of the invention, the asynchronous machine is mechanically connected, on the input side, to a turbine of a conventional energy system. A turbine of this type can be, for example, a gas turbine, a steam turbine or a turbine which is driven by water power. In this form of embodiment of the invention, advantageously, a turbine start-up can be permitted wherein, by means of the multi-stage converter, electrical energy which is drawn from the AC network is converted into mechanical rotational energy of the turbine.

Appropriately, the turbine can be operated at a turbine frequency, wherein the turbine frequency and the frequency of the AC network are different. In this manner, for example, a 50 Hz turbine, by means of the arrangement, can be operated in conjunction with a 60 Hz AC network (or vice versa). Moreover, generators with a pole pair number greater than one can also be connected to a network frequency which deviates from the AC network, including, optionally, operation in a super-synchronous mode. This permits the operation of variable-frequency and non-grid-synchronized turbines.

The arrangement preferably comprises a control apparatus for controlling the multi-stage converter. According to one form of embodiment of the invention, the control apparatus is configured to control reactive power in the asynchronous machine and in the AC network. Accordingly, the arrangement itself, by means of the modular multi-stage converter, can deliver the requisite reactive power on both the network side and the generator side.

The invention further relates to a method for operating an asynchronous machine, in generator operation, for the injection of electrical energy into an AC network.

The object of the invention is the proposal of such a method, which can be implemented in the most cost-effective and flexible manner possible.

According to the invention, this object is fulfilled by a generic method, wherein the asynchronous machine is operated in a double-feed arrangement, by the employment of a modular multi-stage converter in a matrix configuration.

The advantages of the method according to the invention specifically proceed from the above-mentioned advantages of the arrangement according to the invention. It is naturally possible, in conjunction with the method according to the invention, to employ all the above-mentioned characteristics of the arrangement, in isolation or in combination.

The invention is further described hereinafter with reference to the exemplary embodiments represented in FIGS. 1 to 3.

DESCRIPTION OF THE INVENTION

Figure 1:
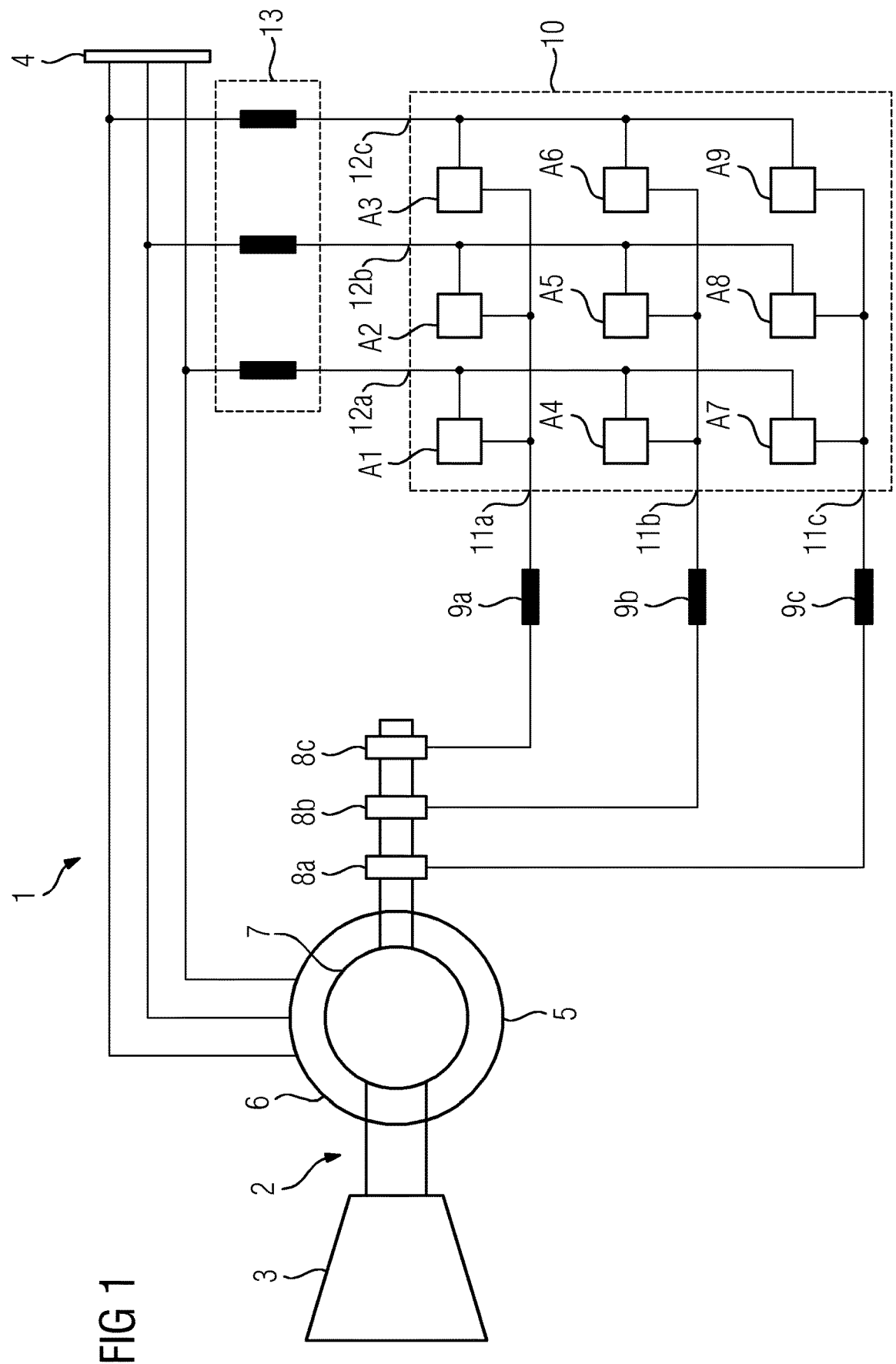
FIG. 1 shows an exemplary embodiment of an arrangement according to the invention, in a schematic representation.

Specifically, FIG. 1 represents an arrangement 1, by means of which mechanical energy is delivered on an output 2 of a turbine 3, is convertible into electrical energy and can be injected into an AC network 4. The turbine 3 is a gas turbine, and operates, according to the example represented in FIG. 1, at a turbine frequency of 50 Hz. In the example represented here, the network frequency in the AC network 4 is 60 Hz.

The arrangement 1 comprises an asynchronous machine 5 in the form of a double-feed asynchronous generator (DFIG). The asynchronous machine 5 comprises a stator 6, which is directly connected to the AC network 4. The asynchronous machine 5 further comprises a rotor 7 which is connected by means of sliprings 8a-c, and via optional smoothing inductances 9a-c, to a first three-phase AC voltage terminal 11a-c of a modular multi-stage converter 10, in a matrix configuration.

The multi-stage converter 10 further comprises a second three-phase AC voltage terminal 12a-c, which is connected via a transformer 13 to the AC network 4. The transformer 13, in the example represented, steps up the network-side voltage on the multi-stage converter 10 in the example show to 25 kV. The multi-stage converter 10 comprises nine converter arms A1-A9, wherein one phase respectively of the first AC voltage terminal 11a-c is connected to one phase respectively of the second AC voltage terminal 12a-c via one of the converter arms A1-A9. In the exemplary embodiment represented in FIG. 1, all the converter arms A1-A9 are of an identical design.

The arrangement 1 further comprises a control apparatus (not represented diagrammatically), which is configured for the regulation of current and voltage on both the network side and the rotor side of the multi-stage converter 10 by the appropriate actuation of power semiconductor switches on the multi-stage converter 10.

Figure 2:
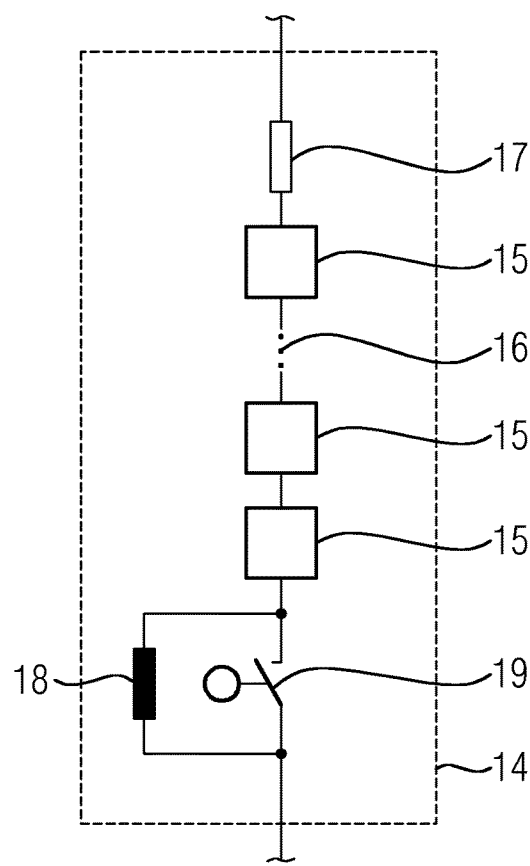
FIG. 2 shows an example of a converter arm of the arrangement according to FIG. 1, in a schematic representation.

FIG. 2 shows an example of the layout of one of the converter arms A1-A9 for the multi-stage converter 10 according to FIG. 1. Specifically, FIG. 2 shows a converter arm 14, which is switchable between one phase of a first AC voltage terminal 11a-c and one phase of a second AC voltage terminal 12a-c.

The converter arm 14 comprises a series-connected arrangement of two-pole switching modules 15 wherein, in the exemplary embodiment represented here, all the switching modules 15 are of an identical design. In principle, the mutually series-connected switching modules 15 can assume any number, and can be adapted to the respective application, as indicated in FIG. 2 by a broken line 16. The higher the number of switching modules 15 in the converter arm, the higher the nominal power rating of the associated modular multi-stage converter. An arm inductance 17 is arranged in series with the switching modules 15.

The converter arm 14 further comprises a charging resistor 18, which can be bridged by means of a controllable switch 19.

Figure 3:
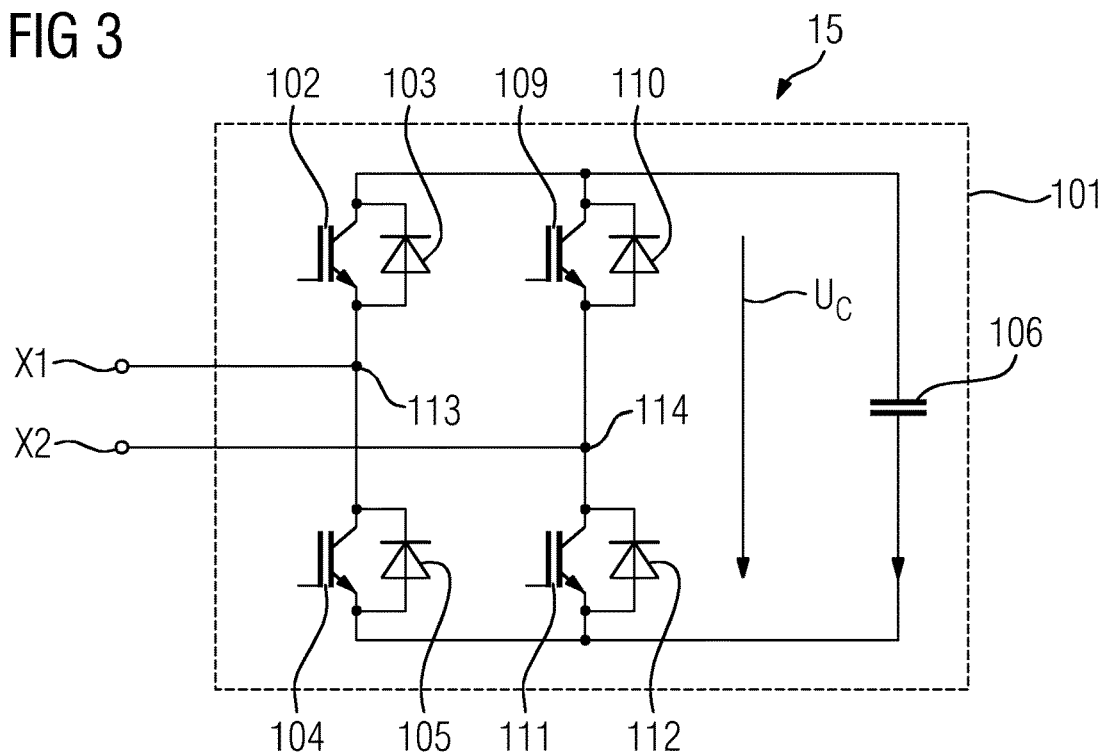
FIG. 3 shows an example of a switching module of the arrangement according to FIGS. 1 and 2, in a schematic representation.

One example of a switching module 15 in the form of a full-bridge module circuit 101 is schematically represented in FIG. 3. The full-bridge circuit 101 comprises a first semiconductor switch 102 in the form of an IGBT, to which a first freewheeling diode 103 is connected in an antiparallel arrangement, and a second semiconductor switch 104 in the form of an IGBT, to which a second freewheeling diode 105 is connected in an antiparallel arrangement. Both semiconductor switches 102 and 104 have a co-directional conducting direction. The full-bridge circuit 101 further comprises a third semiconductor switch 109 in the form of an IGBT, to which a third freewheeling diode 110 is connected in an antiparallel arrangement, and a fourth semiconductor switch 111 in the form of an IGBT, to which a fourth freewheeling diode 112 is connected in an antiparallel arrangement. Both semiconductor switches 109 and 111 have a co-directional conducting direction. The semiconductor switches 102 and 104, with their associated freewheeling diodes 103, 105, thus constitute a series-connected arrangement, which is connected in parallel with a series-connected arrangement constituted by the semiconductor switches 109, 111 and the associated freewheeling diodes 110 and 112. An energy store in the form of a capacitor 106 is arranged in parallel with the two series-connected arrangements. A first pole or terminal X1 of the switching module 15 is arranged on a potential point 113 between the semiconductor switches 102, 104, and a second pole or terminal X2 of the switching module 15 is arranged on a potential point 114 between the semiconductor switches 109, 111.

By an appropriate actuation of the power semiconductors 102, 104, 109 and 111, a voltage present on the terminals X1, X2 can be generated which corresponds to the voltage Uc present on the capacitor 106, to the voltage across the capacitor 106 but with a reverse polarity (−Uc), or to a zero voltage. It should be observed that, in place of IGBTs, other closable and interruptible semiconductor switches, such as e.g. IGCTs, can also be employed.

The invention claimed is:

1. A configuration, comprising:
   an asynchronous machine which, in generator operation, is configured to inject electric power into an AC network; and
   a modular multi-stage converter, wherein said asynchronous machine is operated in a double-feed arrangement by said modular multi-stage converter in a matrix configuration, said multi-stage converter having a plurality of converter arms, each of said converter arms having a series-connected configuration of two-pole switching modules, each of said switching modules having interruptible power semiconductors and an energy store, each of said converter arms having a bridging switch and at least one charging resistor for being bridged by said bridging switch, said at least one charging resistor for pre-charging said energy store.

2. The configuration according to claim 1, wherein said asynchronous machine has a rotor and said modular multi-stage converter is connected to said rotor of said asynchronous machine.

3. The configuration according to claim 1, wherein said multi-stage converter has an n-phase first AC voltage terminal, which is connected to said asynchronous machine, and an m-phase second AC voltage terminal, which is connected to the AC network, wherein each of n phases of said first AC voltage terminal is connected to each of m phases of said second AC voltage terminal by means of exactly one of said converter arms.

4. The configuration according to claim 1, wherein said interruptible power semiconductors and said energy store of said switching modules are respectively mutually connected in a full-bridge circuit.

5. The configuration according to claim 1, further comprising a transformer, said modular multi-stage converter is connected to the AC network via said transformer.

6. The configuration according to claim 1, further comprising a turbine of a conventional energy system, said asynchronous machine is connected, on an input side, to said turbine.

7. The configuration according to claim 6, wherein said turbine is operated at a turbine frequency, wherein the turbine frequency and a frequency of the AC network are different.

8. The configuration according to claim 1, further comprising a control apparatus, by means of said control apparatus reactive power on said asynchronous machine and in the AC network is controllable.

9. A method for operating an asynchronous machine, in a generator operation, for injecting electrical energy into an AC network, which comprises the steps of:
   operating the asynchronous machine in a double-feed configuration, by an employment of a modular multi-stage converter in a matrix configuration having a plurality of converter arms, each of the converter arms having a series-connected configuration of two-pole switching modules, each of the switching modules having interruptible power semiconductors and an energy store, each of the converter arms having a bridging switch and at least one charging resistor for being bridged by the bridging switch; and
   pre-charging the at least one charging resistor for the energy store.

* * * * *